Figure 4:
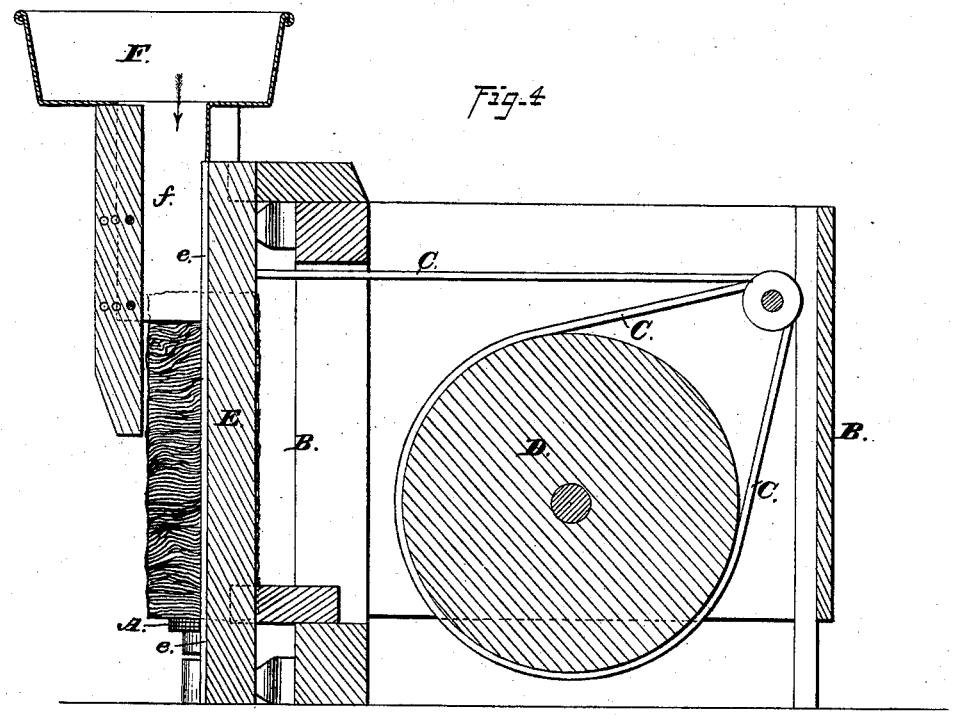

(No Model.) 3 Sheets—Sheet 1.
C. R. WICKES.
Manufacture of Buttons from Plastic Material.
No. 232,582. Patented Sept. 21, 1880.
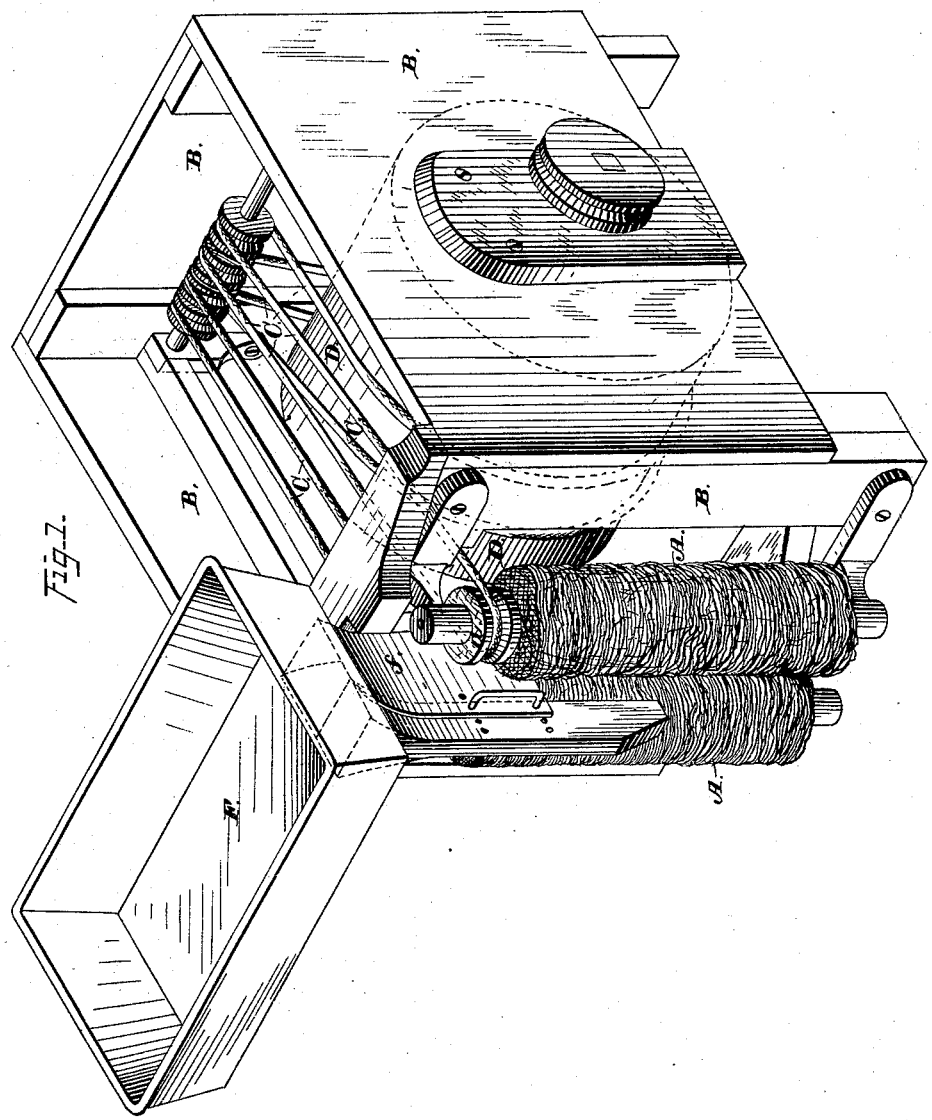

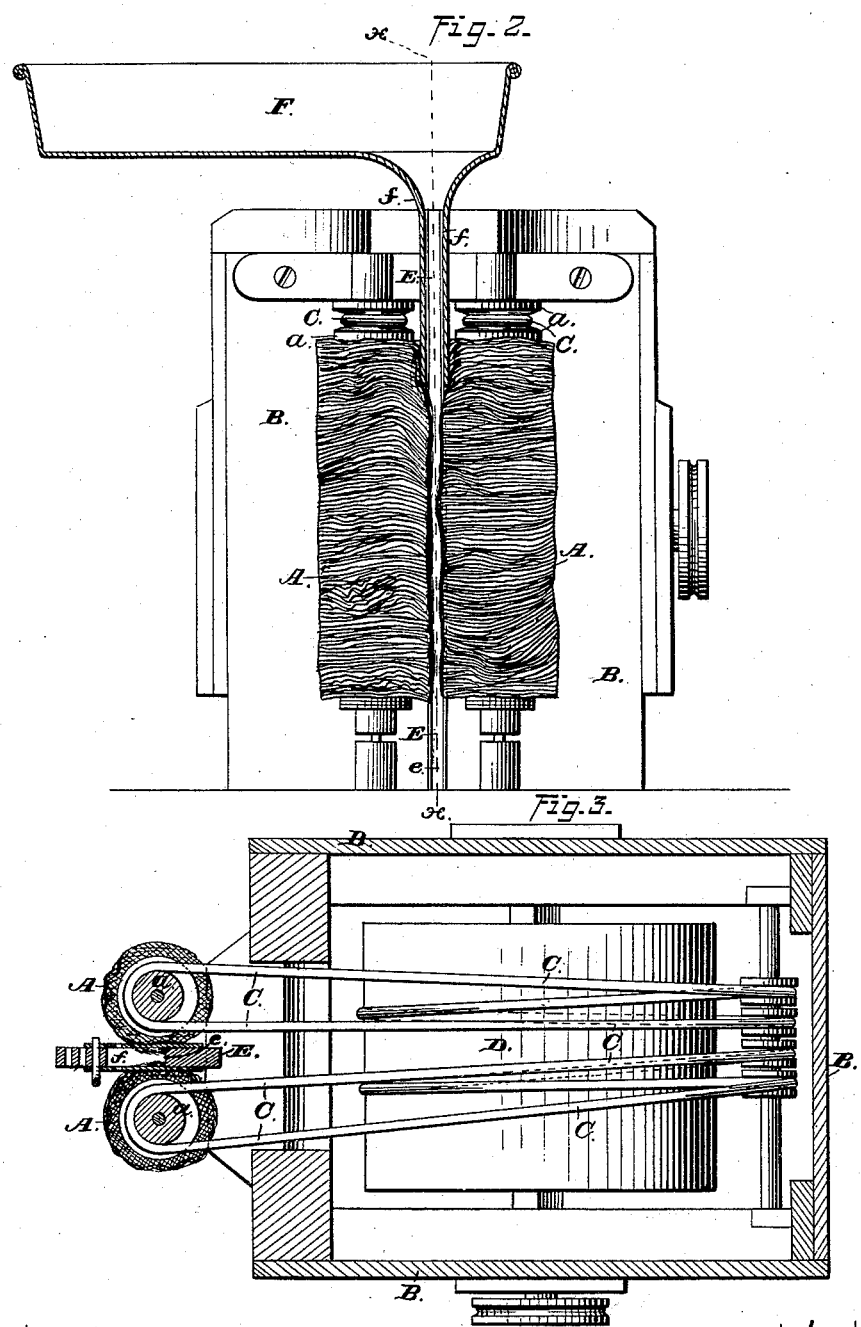

(No Model.)

3 Sheets—Sheet 3.

C. R. WICKES.
Manufacture of Buttons from Plastic Material.

No. 232,582. Patented Sept. 21, 1880.

UNITED STATES PATENT OFFICE.

CHARLES R. WICKES, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 232,582, dated September 21, 1880.

Application filed August 10, 1880. (No model.)

*To all whom it may concern:*

Be it known that I, CHAS. R. WICKES, of Auburn, in the county of Cayuga, and in the State of New York, have invented certain new and useful Improvements in the Manufacture of Buttons from Plastic Material, (Case F;) and I do hereby declare that the following is a full, clear, and exact description thereof, reference being had to the accompanying drawings, making a part of this specification, in which—

Figure 1 is a perspective view of my machine as arranged for use. Fig. 2 is a front elevation of the same, the hopper and feed-tube being in section. Fig. 3 is a plan view of the upper side of said machine, and Fig. 4 is a vertical section of the same upon line $x\ x$ of Fig. 2.

Letters of like name and kind refer to like parts in each of the figures.

In the manufacture of buttons from plastic material it is necessary that the buttons should have all dust removed from their surfaces after completion and before packing, for which purpose it has heretofore been customary to separately present each button to the periphery of an elastic rotating wiping-wheel and to turn said button until each portion of its surface has been brought into contact with said wheel—an operation requiring considerable care and involving the expenditure of much time.

The design of my invention is to lessen the time required for wiping buttons and to enable the work to be more thoroughly done; to which end it consists, principally, as an improvement in the manufacture of buttons from plastic material, in the method of wiping buttons by causing the same to pass between and lengthwise of two inwardly-revolving wiping-rollers having parallel axes, substantially as and for the purpose hereinafter specified.

It consists, further, as an improvement in the manufacture of buttons from plastic material, in a wiping-machine in which are combined two wiping-rollers having parallel axes and arranged to revolve inwardly, and a grooved guide placed in rear of said rollers and in a line with their inner impinging peripheries, substantially as and for the purpose hereinafter shown.

It consists, further, as an improvement in the manufacture of buttons from plastic material, in a wiping-machine in which are combined two inwardly-revolving wiping-rollers having parallel axes, a grooved guide arranged in rear of and parallel with said rollers, and a hopper provided with a discharge-tube which passes into the space between said rollers and guide at one end of the same, substantially as and for the purpose hereinafter set forth.

It consists, finally, in the machine as a whole, its several parts being combined to operate in the manner and for the purpose heinafter shown and described.

In the annexed drawings, A and A represent two rollers, which are each covered nearly to each end with an elastic material, preferably cloth, cut into disks and arranged so that their edges form the periphery of said roller. The rollers A and A are journaled vertically upon the front of a frame, B, with their peripheries in contact, and are caused to rotate inwardly by means of belts C and C, one of which passes around a pulley, $a$, that is attached to one end of each roller, and from thence passes around a drum, D, that is journaled within said frame and adapted to be driven by hand or power.

Immediately in rear of the rollers A and A is a grooved guide, E, which is placed in a line with the impinging peripheries of the same, and at its upper end is connected with a tube, $f$, that is attached to and extends downward from a hopper, F, placed immediately above the frame B. Said tube is rectangular in cross-section, is arranged with its longest transverse dimensions in a line with the impinging peripheries of said rollers and the groove $e$ of said guide E, and its shortest transverse diameter is sufficient to permit of the passage of any button intended to be operated upon, while its front wall is made adjustable, so as to enable its longest transverse dimensions to be varied at will. The upper end of said tube has a flaring or bell shape, so as to enable buttons from said hopper to readily enter the same.

The machine is now complete, and is used as follows, viz: The buttons to be operated upon are placed within the hopper F and fed downward into the tube $f$ by the operative. As each button passes between the rollers A it is moved rearward until its edge rests within and is contained by the groove $e$ of the guide E, after which said button moves downward, rotating as it moves, and each portion of its surface is presented to the peripheries of said rollers until every particle of dust and dirt is removed therefrom and said button emerges from between the lower ends of said rollers clean and ready for packing.

The operation described requires so little time as to enable one machine attended by one operative to do, in a better manner than heretofore, as much work as has heretofore required the labor of a number of operatives.

Having thus fully set forth the nature and merits of my invention, what I claim as new is—

1. As an improvement in the manufacture of buttons from plastic material, the method of wiping buttons by causing the same to pass between and lengthwise of two inwardly-revolving wiping-rollers having parallel axes, substantially as and for the purpose specified.

2. As an improvement in the manufacture of buttons from plastic material, a wiping-machine in which are combined two wiping-rollers having parallel axes, and arranged to revolve inwardly, and a grooved guide placed in rear of said rollers and in a line with their inner, impinging peripheries, substantially as and for the purpose shown.

3. As an improvement in the manufacture of buttons from plastic material, a wiping-machine in which are combined two inwardly-revolving wiping-rollers having parallel axes, a grooved guide arranged in rear of and parallel with said rollers, and a hopper provided with a discharge-tube which passes into the space between said rollers and guide at one end of the same, substantially as and for the purpose set forth.

4. The hereinbefore-described machine, in which the elastic rollers A and A, pulleys $a$ and $a$, belts C and C, drum D, guide E $e$, hopper F, and discharge-tube $f$ are combined with each other and with the frame B, substantially as and for the purpose shown.

In testimony that I claim the foregoing I have hereunto set my hand this 8th day of June, 1880.

CHARLES R. WICKES.

Witnesses:
GEO. S. PRINDLE,
JAS. E. HUTCHINSON.